United States Patent
Liu et al.

(10) Patent No.: US 10,120,637 B2
(45) Date of Patent: Nov. 6, 2018

(54) MIRROR DISPLAY SYSTEM HAVING LOW DATA TRAFFIC AND METHOD THEREOF

(71) Applicant: BARCO LIMITED, New Taipei (TW)

(72) Inventors: Shih-Ping Liu, New Taipei (TW); Kuan-Yu Chou, New Taipei (TW); Cheng-Hsiung Chang, New Taipei (TW); Yen-Hsiang Wang, New Taipei (TW); Chia-Chen Kuo, New Taipei (TW)

(73) Assignee: BARCO LIMITED, New Taipei (TW)

( * ) Notice: Subject to any disclaimer, the term of this patent is extended or adjusted under 35 U.S.C. 154(b) by 307 days.

(21) Appl. No.: 14/933,296

(22) Filed: Nov. 5, 2015

(65) Prior Publication Data

US 2016/0162251 A1    Jun. 9, 2016

(30) Foreign Application Priority Data

Dec. 9, 2014   (TW) .............................. 103142819 A

(51) Int. Cl.
*G06F 3/048*   (2013.01)
*G06F 3/14*    (2006.01)
*G09G 5/14*    (2006.01)

(52) U.S. Cl.
CPC .......... *G06F 3/1462* (2013.01); *G06F 3/1415* (2013.01); *G09G 5/14* (2013.01); *G09G 2340/0492* (2013.01); *G09G 2370/16* (2013.01)

(58) Field of Classification Search
CPC ........ G06F 3/1462; G06F 3/1415; G09G 5/14
(Continued)

(56) References Cited

U.S. PATENT DOCUMENTS 7,697,925 B1 * 4/2010 Wilson .................... H04M 1/22
                                                           455/418
9,152,373 B2 * 10/2015 King ...................... G06F 3/1454
(Continued)

FOREIGN PATENT DOCUMENTS

| CN | 101360059 A | 2/2009 |
| CN | 102377877 A | 3/2012 |
| CN | 103460177 A | 12/2013 |

OTHER PUBLICATIONS

Office Action dated Feb. 2, 2018 of the corresponding China patent application No. 201510565812.5.

*Primary Examiner* — David Phantana-angkool
(74) *Attorney, Agent, or Firm* — Chun-Ming Shih; HDLS IPR Services

(57) ABSTRACT

A mirror display system having low data traffic comprises a transmitting-end device and a receiving-end device. The transmitting-end device stores a first file and transforms the first file into the first page images. The receiving-end device stores a second file with same content of the first file and transforms the second file into the second page images. The transmitting-end device selects one of the first page images according to a page-selecting operation, and transmits an identifying page data of the selected first page image to the receiving-end device. The receiving-end device selects and displays one of the second page images corresponding to the identifying page data. With pre-storing the file duplicate in the receiving-end device and the receiving-end automatically generating the image, the required data traffic of the mirror display is effectively reduced and the mirror display operation is made smoother.

18 Claims, 11 Drawing Sheets

(58) Field of Classification Search
USPC .......................................................... 715/761
See application file for complete search history.

(56) References Cited

U.S. PATENT DOCUMENTS

| | | | | |
|---|---|---|---|---|
| 9,182,936 B2* | 11/2015 | Hsu | ........................ | G06F 3/1423 |
| 9,727,298 B2* | 8/2017 | Naruse | ................... | G06F 3/1446 |
| 9,753,534 B2* | 9/2017 | Shigeta | .................. | G06F 3/0488 |
| 9,817,627 B2* | 11/2017 | Kreiner | ................. | G06F 3/1446 |
| 9,817,798 B2* | 11/2017 | Lee | ...................... | G06F 17/2247 |
| 9,877,406 B2* | 1/2018 | Hochman | ................. | G09F 9/30 |
| 2008/0238954 A1* | 10/2008 | Hasuike | ................ | G06F 3/0421 |
| | | | | 345/698 |
| 2011/0248983 A1* | 10/2011 | Kim | ....................... | G03B 21/14 |
| | | | | 345/212 |
| 2012/0262379 A1* | 10/2012 | King | .................... | G06F 3/1454 |
| | | | | 345/173 |
| 2014/0295763 A1 | 10/2014 | Lee | | |
| 2015/0061971 A1* | 3/2015 | Choi | .................... | G06F 3/1446 |
| | | | | 345/2.3 |
| 2015/0084837 A1* | 3/2015 | Mese | ................... | G06F 3/1446 |
| | | | | 345/1.3 |

* cited by examiner

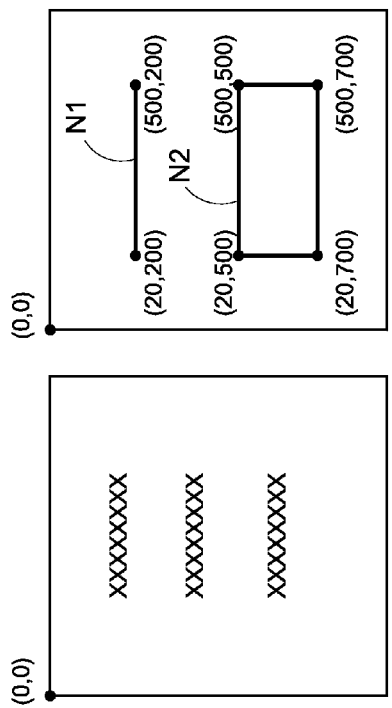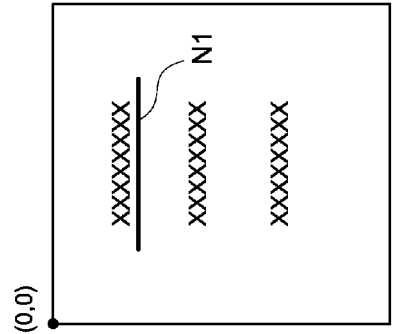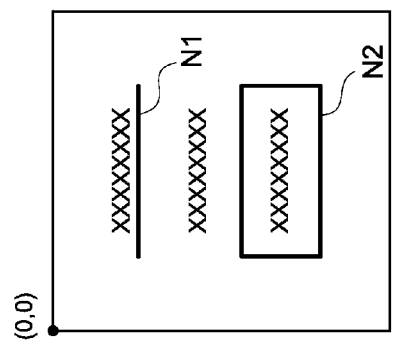

MIRROR DISPLAY SYSTEM HAVING LOW DATA TRAFFIC AND METHOD THEREOF

BACKGROUND OF THE INVENTION

Field of the Invention

The present invention relates to a mirror display system and a mirror display method, in particular relates to a mirror display system having low data traffic and a mirror display method having low data traffic.

Description of Prior Art

In today's modern society, briefing or speech is the most common channel to share information in public. A fluent and interactive briefing provide an effective means to let the audience quickly pick up the main ideas the speaker want to deliver and buy-in the ideas. Accordingly, it is an important subject to speakers to make the briefing fluent and interactive.

However, speakers mostly have to use an organizer's (such as the venue provider) computer in a brief. Frequently, a brief has to stop due to the fact that the speaker is not familiar with the computer provided. Or, the speaker fails to operate the briefing file properly (for example an operation to move to the other page, a note operation or a zooming operation) to interact with the audience because the speaker is not familiar with the computer.

To resolve the above issues, a mirror display method is provided currently. FIG. 1 is a flowchart of a prior art mirror display method. According to the diagram, the prior art mirror display method uses a mirror display system, which comprises a mobile device (such as a smart phone or tablet) and a display device (such as projector or LCD). The mobile device is held by a speaker, and the display device is provided by an organizer. The mobile device and the display device use the following steps to execute mirror display.

The mobile device reads a stored briefing file, and display a screen after the briefing file is executed on a display screen of the mobile device (Step S10). The mobile device captures a screen displayed on the displayed screen (Step S12), and transmits captured display screen to the display device via a network (Step S14). The display device performs zooming on dimension of the received displayed screen as display dimension of the display device (Step S16), and display the display screen after zooming (Step S18). Thus, the speaker is allowed to use a familiar mobile device to brief, and skillfully operates on the briefing file to interact with audience.

However, in the prior art mirror display method, the mobile device has to continue to transmit captured display screen to the display device in order to continue update the displayed screen on the display device. Because transmitting a display screen requires higher data traffic, delays may occur to the mirror display between the mobile device and the display device given the network bandwidth is insufficient or the connection is poor between the mobile device and the display device. In consequence, the brief may be interrupted or even stopped.

As a result, it is desirable to provide a new method to resolve the above mentioned issues existed in the prior art mirror display method.

SUMMARY OF THE INVENTION

The objective of the present invention is to provide a mirror display system having low data traffic and a mirror display method having low data traffic.

In order to achieve the above objective, a mirror display system having low data traffic is provided which comprises a transmitting-end device and a receiving-end device connected to a display module. The transmitting-end device comprises a first wireless transceiver, a human machine interface displaying images and receiving a page-selecting operation, a first memory storing the first file, a first processor electrically connected to the first wireless transceiver, the human machine interface and the first memory. The first processor comprises a first transforming module reading and transforming the first file into a plurality of the first page images, and a first processing module connected to the first transforming module. The first processing module selects one of the plurality of first page images according to the page-selecting operation, transmitting the selected first page image to the human machine interface for displaying and externally transmitting an identifying page data of the selected first page image via the first wireless transceiver. The receiving-end device comprises a second wireless transceiver receiving the identifying page data from the transmitting-end device, a second memory storing a second file, and a second processor electrically connected to the first wireless transceiver and the second memory. The second file and the first file having the same content.

Further, in order to achieve the above objective, a mirror display method having low data traffic is provided which is used in a mirror display system. The mirror display system comprises a transmitting-end device and a receiving-end device. The mirror display method comprises following steps: a) the transmitting-end device reading a first file; b) transforming the first file into a plurality of the first page images; c) receiving an page-selecting operation; d) selecting one of the plurality of the first page images according to the page-selecting operation; e) displaying the selected first page image; f) transmitting the identifying page data of the selected first page image to the receiving-end device; g) the receiving-end device reading a second file, wherein the second file and the first file have the same content; h) transforming the second file into a plurality of the second page images, wherein the plurality of the second page images respectively corresponding the plurality of the first page images; i) selecting the second page images corresponding to the identifying page data; and j) displaying the selected second page images, wherein the selected second page images and the selected first page images have the same content.

Compare to prior arts, the advantage provided by the present invention is that, the required data traffic of the mirror display is effectively reduced and the mirror display operation is made smoother.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

FIG. 5A is the schematic diagram of the first page image according to the third embodiment of the present invention;

FIG. 5B is a schematic diagram of the first note picture layer according to the third embodiment of the present invention;

FIG. 5C is the first schematic diagram of the display screen according to the third embodiment of the present invention;

FIG. 5D is the second schematic diagram of the display screen according to the third embodiment of the present invention;

DETAILED DESCRIPTION OF THE INVENTION

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
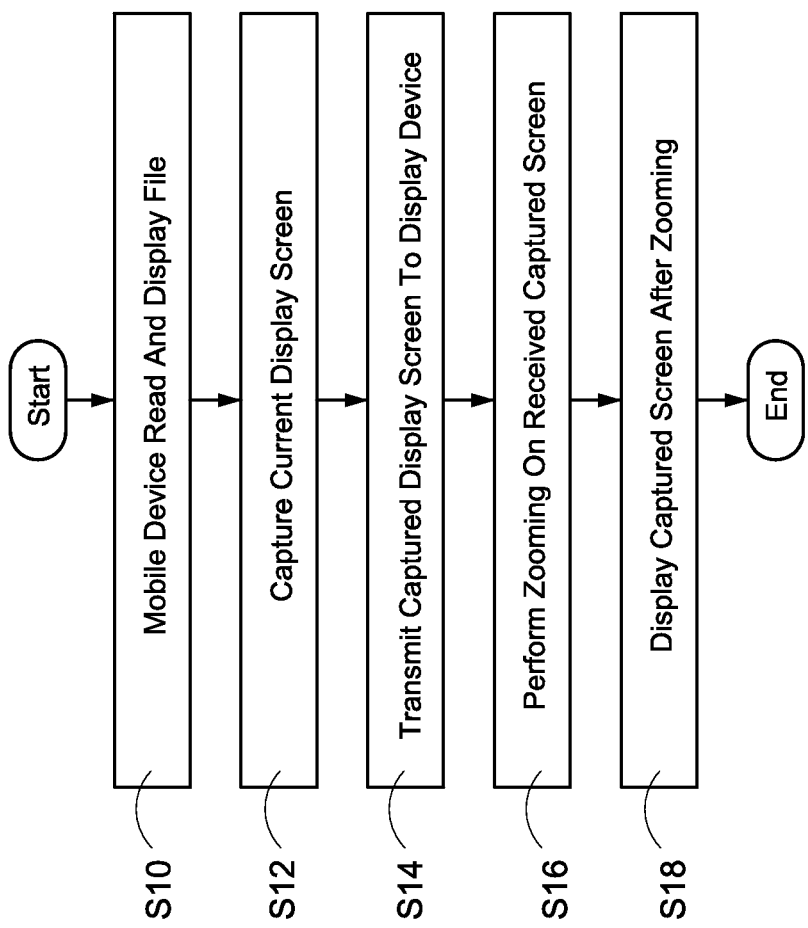
FIG. 1 is a flowchart of a prior art mirror display method.
Figure 2:
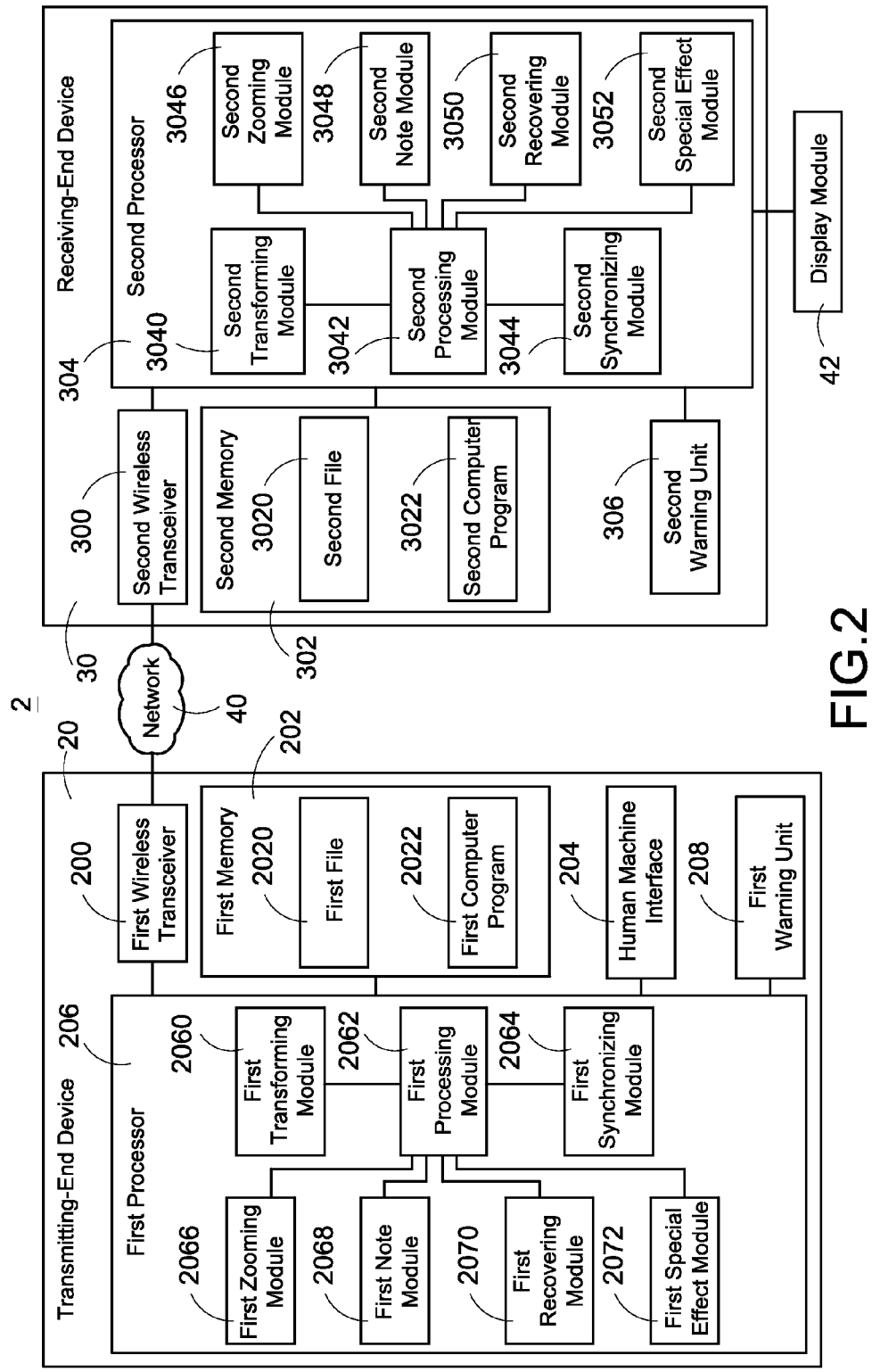
FIG. 2 is an architecture diagram of the mirror display system according to the first embodiment of the present invention.

FIG. 2 is an architecture diagram of the mirror display system according to the first embodiment of the present invention. As the embodiment shown in FIG. 2, the mirror display system having low data traffic 2 (referred as the mirror display system 2 in the following description) comprises a transmitting-end device 20 and a receiving-end device 30. The transmitting-end device 20 connects to the receiving-end device 30 via a network 40.

The transmitting-end device 20 comprises a first wireless transceiver 200, a first memory 202, a human machine interface 204 and a first processor 206. The first processor 206 is electrically connected to the first wireless transceiver 200, the first memory 202 and the human machine interface 204. Preferably, the transmitting-end device 20 is a smart phone, a tablet, a wearable computer or notebook, but is not limited thereto.

The receiving-end device 30 comprises a second wireless transceiver 300, a second memory 302 and a second processor 304. The second processor 304 is electrically connected to the second wireless transceiver 300, the second memory 302 and an external display module 42. Preferably, the receiving-end device 30 is a TV box, setup box, video box or personal computer, but is not limited thereto.

In the other embodiment of the present invention, the receiving-end device 30 is installed in a control box of a displayer, and is connected to the display module 42 which is also installed in the displayer via internal wiring.

Next, each components of the transmitting-end device 20 are further illustrated in the following. The first wireless transceiver 200 transmits data externally via the network 40. Substantially, the first wireless transceiver 200 establishes a network connection with the second wireless transceiver 300 of the receiving-end device 30 via the network 40 for transmitting data to the second wireless transceiver 300. Preferably, the first wireless transceiver 200 is a Wi-Fi wireless network transceiver, bluetooth network wireless network transceiver, Zigbee wireless network transceiver or Near Field Communication (NFC) wireless transceiver. The network 40 is Wi-Fi wireless network, Wi-Fi Direct wireless network, bluetooth wireless network, Zigbee wireless network or NFC network, but is not limited thereto.

The first memory 202 stores a first file 2020. Substantially, the first file 2020 is stored in the first memory 202 via electronic data format. Preferably, the first memory 202 is a flash memory, HardDisk Drive (HDD), Random Access Memory (RAM) or cache memory. The first file 2020 is a word processing file (for example computer files with file extensions such as .txt, .doc or .pdf), images file (for example computer files with file extensions such as .jpeg, .psd or .png) or specific application file (for example computer files with file extensions such as .ppt or .xlsx), but is not limited thereto.

The human machine interface 204 is used for displaying images and receiving various external operations by users. Preferably, the human machine interface 204 is a touchscreen, a display with buttons installed or a combination of a display and touch panel, but is not limited thereto.

The first processor 206 is used for controlling the transmitting-end device 20. Substantially, the first processor 206 comprises a first transforming module 2060 and a first processing module 2062 connected to the first transforming module 2060.

The first transforming module 2060 reads the first file 2020 in the first memory 202, and transforms the first file 2020 into a plurality of the first page images. Substantially, the first transforming module 2060 reads the first file 2020, and processes the operating screen or the operation results of the application (processes such as splitting, cutting or image transforming) in order to generate the plurality of the first page images via executing an application.

For example, if the first file 2020 is a PowerPoint file (for examples computer files with file extensions such as .ppt or .pps), then the first transforming module 2060 reads the PowerPoint file via executing a PowerPoint application. Next, the first transforming module 2060 performs image transforming processing on a plurality of slides in the PowerPoint files in order to respectively generate the plurality of the first page images corresponding to the plurality of the slides.

In another example, if the first file 2020 is a column file (for example computer files with file extensions such as .xls, .xml or .html), then the first transforming module 2060 reads the column file via executing a column display application (such as a spreadsheet application or a web page browser). Next, the first transforming module 2060 splits the operating screen of the column display application into a plurality of blocks, and performs image transforming processing on the plurality of blocks respectively in order to respectively generate the plurality of the first page images corresponding to the plurality of blocks.

The first processing module 2062 receives a page-selecting operation from the user via the human machine interface 204, and selects one of the plurality of the first page images according to the page-selecting operation. Next, the first processing module 2062 performs image processing (such as image zooming processing, image format transforming processing or other image pre-processing) on the selected first page image, and transmits the processed first page image to the human machine interface 204 to display. Additionally, when the first processing module 2062 performs above operations, the first processing module 2062 also simultaneously externally transmits identifying page data of the selected first page image via the first wireless transceiver 200.

It should be noted that the identifying page data is used for identifying individual first page image. Preferably, when the first transforming module 2060 transforms the first file into the plurality of the first page images, the first transforming module 2060 makes the plurality of the first page images respectively correspond to the plurality of the identifying page data as reference data afterwards. Preferably, a plurality of the identifying page data are serial numbers of the plurality of the first page images, or page numbers of corresponding pages of the plurality of the first page images in the first file 2020 (when the first file 2020 is a word processing file), but is not limited thereto.

Next, each components of the receiving-end device 30 are further illustrated in the following. The second wireless transceiver 300 is used for receiving the data (such as the identifying page data) via the network 40. Substantially, the second wireless transceiver 300 establishes the network connection via the network 40 and the first wireless transceiver 200 of the transmitting-end device 20 in order to receive the data from the transmitting-end device 300. Preferably, the second wireless transceiver 300 and the first wireless transceiver 200 are wireless transceiver of the same category (for example both are Wi-Fi wireless network transceivers, bluetooth wireless network transceivers, Zigbee wireless network transceivers or NFC wireless transceivers).

The second memory 302 stores a second file 3020. Substantially, the second file 3020 is stored in the first memory 302 via electronic data format. Preferably, the second memory 302 is a flash memory, HardDisk Drive (HDD), Random Access Memory (RAM) or cache memory, but is not limited thereto.

It should be noted that, the second file 3020 and the first file 2020 have the same content. In other words, if the first file 2020 and the second file 3020 are processed by the same application, the generated operation screens or operation results are also the same (for example display the same images or display the same texts). Preferably, the second file 3020 and the first file 2020 have the same file type, or the second file 3020 is the duplicate file or synchronizing file of the first file 2020.

The second processor 304 is used for controlling the receiving-end device 30. Substantially, the second processor 304 comprises a second transforming module 3040 and a second processing module 3042 connected to the second transforming module 3040.

The second transforming module 3040 reads the second file 3020 from the second memory 302, and transforms the second file 3020 into a plurality of the second page images. The transforming method and rules are identical with transforming method and rules used by the first transforming module 2060 transforming the first file 2020 into the plurality of the first page images, and are not repeated accordingly.

It should be noted that, the second transforming module 3040 and the first transforming module 2060 must use the same transforming rules or transforming method (such as use the same image transforming software engine or image transforming program) for transforming the second file 3020 into the second plurality of page images. Thus, the obtained plurality of the second page images from the transforming processing respectively corresponds to the plurality of the first page images. The corresponding first page image and second page image have the same content. In other words, the corresponding first page image and second page image represent the same pictures or texts in display.

The second processing module 3042 obtains the received identifying page data from the second wireless transceiver 300, and selects the second page image corresponding to the identifying page data from the plurality of the second page images. Preferably, the selected second page image and the selected first page images have the same content.

Next, the second processing module 3042 performs image processing on the selected second page (such as image zooming processing, image format transforming processing or other image pre-processing), and transmits the processed second page image to the display module 42 to display.

Thus, the human machine interface 204 of the transmitting-end device 20 and the display module 42 connected to the receiving-end device 30 display the same content and accordingly achieve the purpose of the mirror display. The transmitting-end device 20 is only required to transmit the identifying page data to the receiving-end device 30 which has less data, for enabling the display module 42 and the human machine interface 204 to synchronize the display by switching to the other displayed screen in order to achieve the switching synchronization function without transmitting the screenshot of the human machine interface 204 which has more data.

Figure 3A:
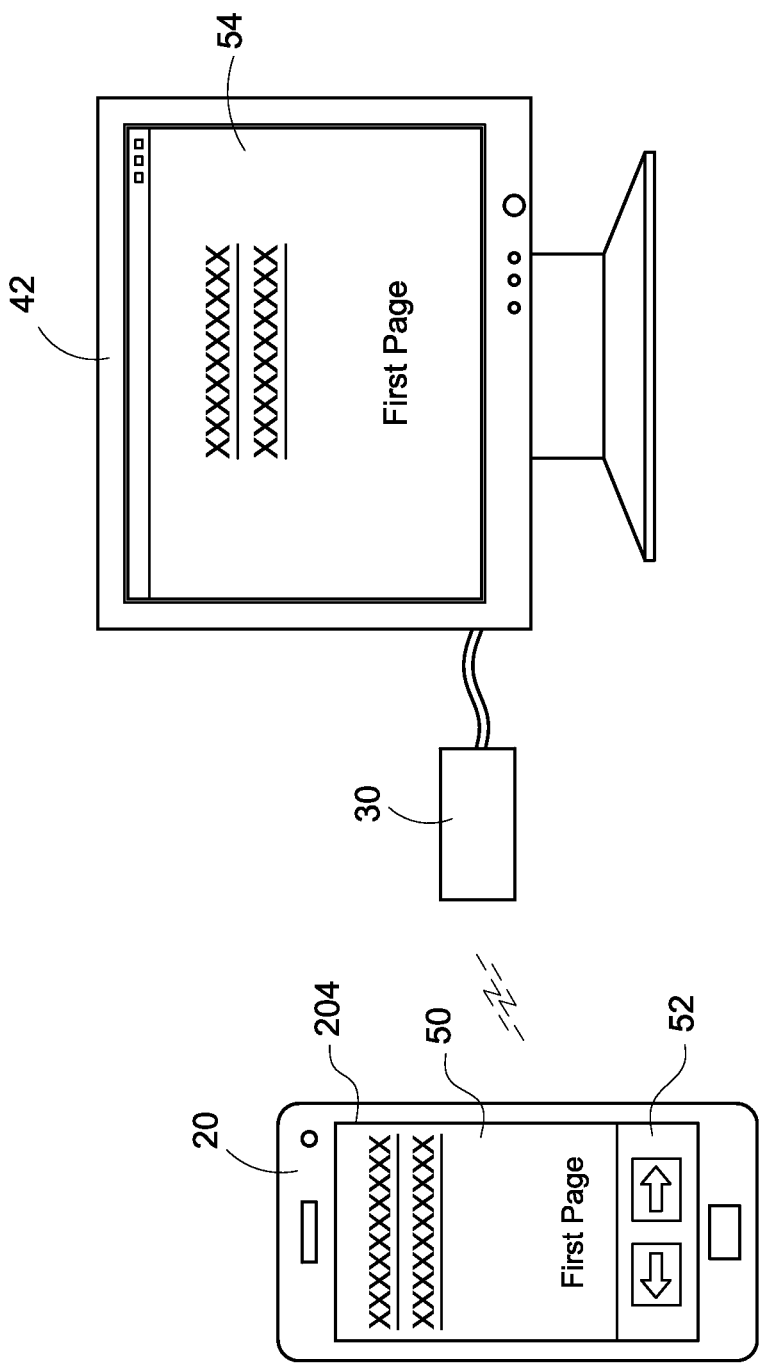
FIG. 3A is the first using schematic diagram of the mirror display system according to the first embodiment of the present invention.
Figure 3B:
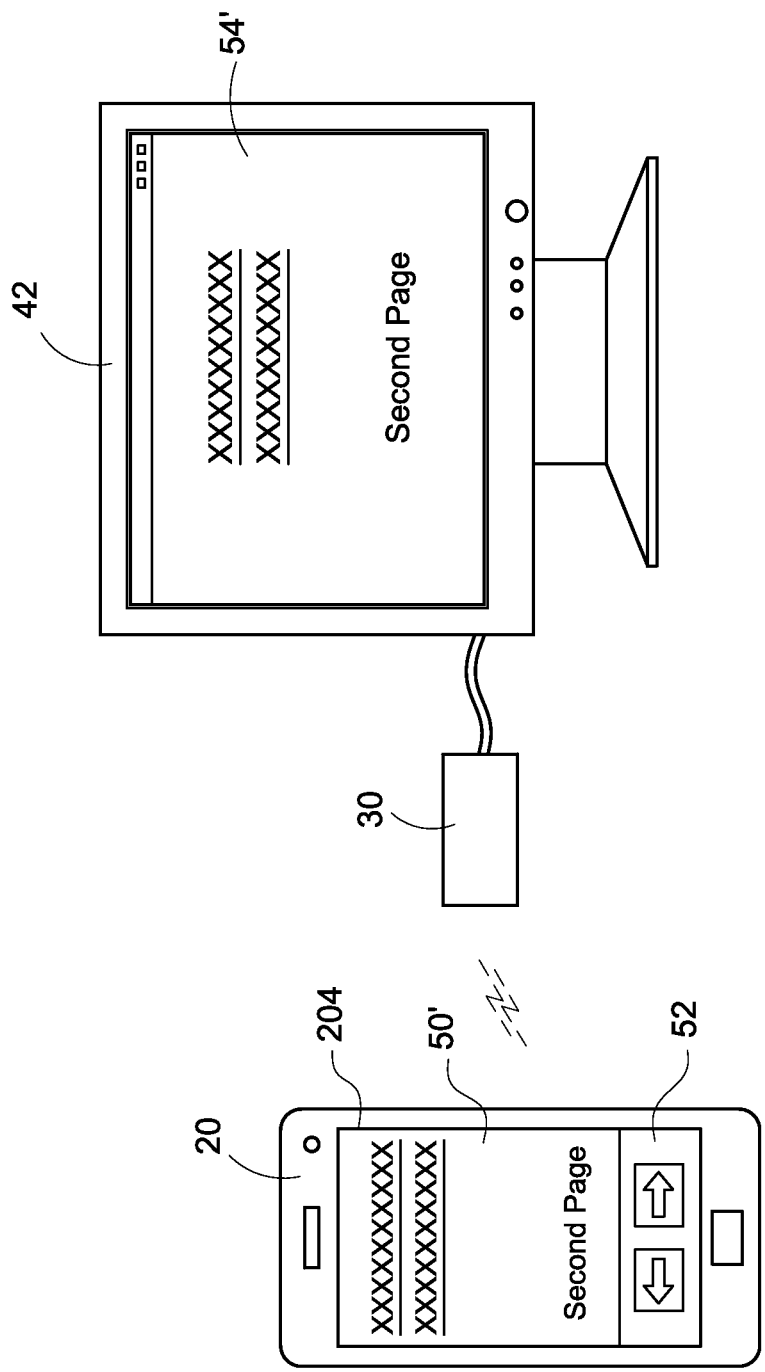
FIG. 3B the second using schematic diagram of the mirror display system according to the first embodiment of the present invention.

Refer to FIG. 3A and FIG. 3B, FIG. 3A is the first using schematic diagram of the mirror display system according to the first embodiment of the present invention, and FIG. 3B the second using schematic diagram of the mirror display system according to the first embodiment of the present invention. The diagrams are used for illustrating the mentioned switching synchronization function with examples. In the examples, the transmitting-end device 20 is a smart phone, and the human machine interface 204 is a touchscreen, and the receiving-end device 30 is a TV box.

As shown in FIG. 3A, the transmitting-end device 20 and the receiving-end device 30 establish the network connection. After the transmitting-end device 20 opens the first file 2020, the first frame of the first page images (such as a mobile display screen 50) is displayed on the human machine interface 204, and further an operating interface 52 is displayed on the human machine interface 204 so that users are allowed to perform page selection operation by entering data. The transmitting-end device 20 transmits the identifying page data (in the present example, the identifying page data is "1") of the first frame of the first page image to the receiving-end device 30.

The receiving-end device 30 receives the identifying page data, opens and transforms the second file 302 into the plurality of the second page data. Next, the receiving-end device 30 selects the second page image corresponding to the identifying page data (for example the external display screen 54 is the first frame of the second page images), and transmits the first frame of the second page images to the display module 42 to display.

When the user performs the page selection operation by entering data via the operating interface 52 (in the present example, the page selection operation entered by the user is "Next Page"), the transmitting-end device 20 selects and displays the second frame of the first page images (the mobile display screen 50' shown in FIG. 3B), and transmits the identifying page data of the second frame of the first page images (in the present example, the identifying page data is "2") to the receiving-end device 30.

The receiving-end device 30 receives the identifying page data, selects the second page image corresponding to the identifying page data (for example the second frame of the second page images is the external display screen 54'), and transmits the second frame of the second page images to the display module 42 to display. Thus, the transmitting-end device 20 and the receiving-end device 30 achieve the switching synchronization function of the display screen.

Refer to FIG. 2, in another embodiment of the present invention, the first processor 206 further comprises a first synchronizing module 2064. The first synchronizing module 2064 connects to the first processing module 2062, and detects if the receiving-end device 30 stores the second file 3020, or if the second file 3020 and the first file 2020 have the same content. Upon detecting that the receiving-end device 30 does not store the second file 3020 or the second file 3020 and the first file 2020 have different contents, the first synchronizing module 2064 sends a warning via a first warning unit 208 (such as a speaker or an indicator) connected to the first processor 206, or displays a waning message in the human machine interface 204. Or, the first synchronizing module 2064 transmits the first file 2020 to the receiving-end device 30 to be the second file 3020 via the first wireless transceiver 200. Thus, the automatic synchronizing processing of the first file 2020 and the second file 3020 is achieved.

In another embodiment of the present invention, the second processor 304 further comprises a second synchronizing module 3044. The second synchronizing module 3044 connects to the second processing module 3042, and detects if the transmitting-end device 20 stores the first file 2020, or the first file 2020 and the second file 3020 have the same content. Upon detecting the transmitting-end device 20 does not store the first file 2020 or the first file 2020 and the second file 3020 do not have the same content, the second synchronizing module 3044 sends a warning via a second warning unit 306 (such as a speaker or an indicator) connected to the second processor 304, or transmits a waning message to the display module 42 to display. Or, the second synchronizing module 3044 transmits the second file 3020 to the transmitting-end device 20 to be the first file 2020 via the second wireless transceiver 300. Thus, the automatic synchronizing processing of the second file 3020 and the first file 2020 is achieved.

A display screen synchronizing zooming function is further illustrated in another embodiment of the present invention. The detailed steps to implement the synchronizing zooming function of the display screen are illustrated in the following.

The first processor 206 further comprises a first zooming module 2066, and the second processor 304 further comprises a second zooming module 3046. The first zooming module 2066 connects to the first processing module 2062. Upon the human machine interface 204 receives a screen zooming operation, the visual range of the first page image displayed on the human machine interface 204 is adjusted according to the screen zooming operation. The first zooming module 2066 calculates the zooming control data according to the adjusted visual range of the first page image, and transmits the zooming control data to the receiving-end device 30 via the first wireless transceiver 200, wherein the visual range of the first page image refers to the whole/part of the first page image displayed on the human machine interface 204.

For example, if the screen zooming operation is a zoom-in operation, the transmitting-end device 20 reduces the visual range of the first page image, so that the human machine interface 204 is allowed to display more details of the specific area of the first page image to generate an image zoom-in effect. If the screen zooming operation is a zoom-out operation, the transmitting-end device 20 increases the visual range of the first page image, so that the human machine interface 204 is allowed to display more content of the first page image to generate an image zoom-out effect.

The second zooming module 3046 connects to the second processing module 3042 and receives the zooming control data via the second wireless transceiver 300. The second processing module 3042 adjusts the visual range of the second page image currently displayed on the display module 42 according to the zooming control data, wherein the visual range of the second page image refers to the whole/part of the second page images displayed on the display module 42.

Substantially, the image dimension of the plurality of the first page images generated by the first transforming module 2060 and the image dimension of the plurality of the second page images generated by the second transforming module 3040 are different. For example, the image dimension of the plurality of the first page images may correspond to the display resolution of the human machine interface 204 or the image processing capability of the transmitting-end device 20; and the image dimension of the plurality of the second page images may correspond to the display resolution of the display module 42 or the image processing capability of the receiving-end device 30.

When the human machine interface 204 receives the screen zooming operation, the first zooming module 2066 according to the screen zooming operation calculates a first reference point location and a first visual range dimension based on the first page image after the screen zooming operation. The first reference point location is the location of a specific pixel in the visual range of the first page image (for example the top leftmost pixel of the visual range, the bottom rightmost pixel of the visual range or the center pixel of the visual range). The first visual range dimension is used for indicating the size of the visual range in reality.

For example, if the visual range is a square, the first visual range dimension includes the length and width of the square. The area of the visual range is calculated based on the length and the width of the square. If the visual range is a circle, the first visual range dimension can be the radius of the circle and the area of the first visual range dimension is calculated based on the radius.

Preferably, the first visual range dimension is calculated based on pixels. For example, if the visual range is a square, the visual range dimension is 1024 pixels (the length of the square)×768 pixels (the width of the square).

Next, the first zooming module 2066 transmits the first reference point location and the first visual range dimension based on the first page image as the zooming control data to the receiving-end device 30. Preferably, the first zooming module 2066 further transmits the image dimension of the first page image as the zooming control data to the receiving-end device 30.

The second zooming module 3046 receives the zooming control data via the second wireless transceiver 300, and calculates a second reference point location and a second visual range dimension based the second page image according to the first reference point location and the first visual range dimension based on the first page image. Preferably, the second zooming module 3046 performs the above calculation according to a ratio between the first page image and the second page image.

Next, the second zooming module 3046 adjusts the visual range of the second page image according to the second reference point location and the second visual range dimension, and the display module 42 is enabled to display the adjusted visual range of the second page image.

It should be noted that, in the present invention, the second zooming module 3046 calculates based on the second reference point location and the second visual range dimension, but is not limited thereto.

In another embodiment of the present invention, the first zooming module 2066 calculates the second reference point location and the second visual range dimension based on the second page image according to the first reference point location, the first visual range dimension and the ratio between the first page image and the second page image based on the first page image. The first zooming module 2066 transmits the second reference point location and the second visual range dimension generated from the calculation to the receiving-end device 30 as the zooming control data.

Thus, when the user operates on the transmitting-end device 20 for adjusting the visual range of the first page image displayed on the human machine interface 204, the transmitting-end device 20 also automatically at the same time adjusting the visual range of the second page image displayed on the display module 42 and thus implements the synchronizing zooming function of the display screen. In addition, because the only data the transmitting-end device 20 has to transmit is the zooming control data and the display screen of the human machine interface 204 is not required to transmit. According to the present invention, not only the synchronizing zooming function of the display screen is implemented, also the data traffic is effectively lowered and the mirror display and associated control flow are made smoother.

Figure 4B:
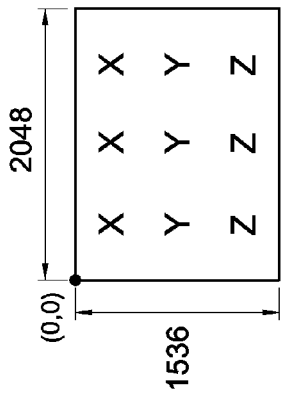
FIG. 4B is the first schematic diagram of the visual range of the second page image according to the second embodiment of the present invention.
Figure 4A:
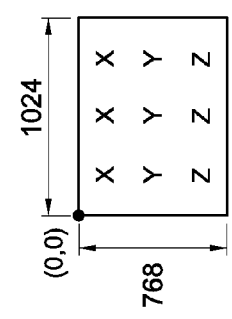
FIG. 4A is the first schematic diagram of the visual range of the first page image according to the second embodiment of the present invention.
Figure 4D:
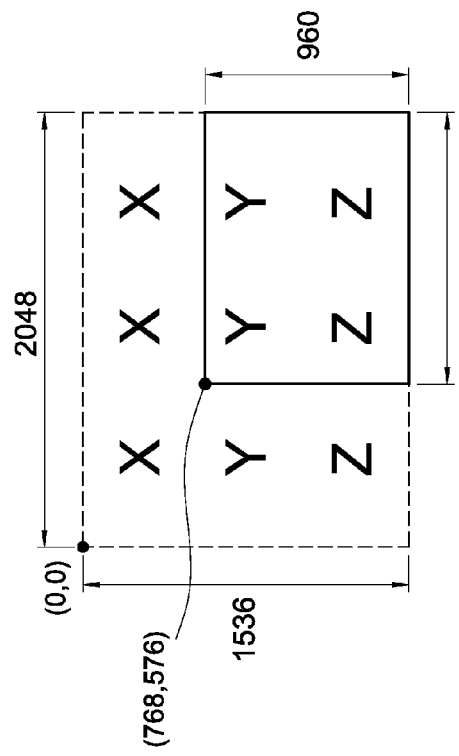
FIG. 4D is the second schematic diagram of the visual range of the second page image according to the second embodiment of the present invention.
Figure 4C:
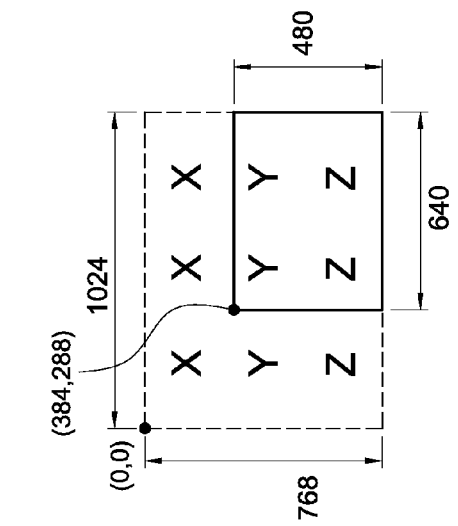
FIG. 4C is the second schematic diagram of the visual range of the first page image according to the second embodiment of the present invention.

Refer to FIG. 4A-4D, FIG. 4A is the first schematic diagram of the visual range of the first page image according to the second embodiment of the present invention, FIG. 4B is the first schematic diagram of the visual range of the second page image according to the second embodiment of the present invention, FIG. 4C is the second schematic diagram of the visual range of the first page image according to the second embodiment of the present invention, and FIG. 4D is the second schematic diagram of the visual range of the second page image according to the second embodiment of the present invention. The diagrams are used for illustrating the synchronizing zooming function of the display screen with examples.

In the present example, the image dimension of the first page image is 1024 pixels×768 pixels, and the visual range of the first page images is the whole frame of the image (refer to FIG. 4A, the area surrounded by a solid line). The image dimension of the second page image is 2048 pixels×1536 pixels, and the visual range of the second page image corresponds to the visual range of the first page images which is also the whole frame of the image (refer to FIG. 4B, the area surrounded by a solid line). The zooming control data comprises the first reference point location, the first visual range dimension and the image dimension of the first page image based on the first page images. For example, the first reference point location is the top leftmost pixel of the visual range. The first visual range is square.

The location of the plurality of pixels of the first page image respectively correspond to a plurality of coordinate values under a two dimension first coordinate system; and the location of the plurality of pixels of the second page image respectively correspond to a plurality of coordinate values under a two dimension second coordinate system When the user enters the screen zooming operation (in the present example, a zoom-in operation), the transmitting-end device 20 re-adjusts the visual range of the first page images according to the screen zooming operation (refer to FIG. 4C, in the present example, the adjustment is reducing the visual range of the first page image), and performs processing on the visual range of the first page images (for example zoom-in the visual range of the first page image to be the display resolution of the human machine interface 204 and display in full screen), and transmits the processed visual range of the first page image to the human machine interface 204 to display. Next, the transmitting-end device 20 calculates and transmits the first reference point location based on the first page images (i.e. the coordinate values (384,288) of the first coordinate system), the first visual range dimension (i.e. 640 pixels×480 pixels) and the image dimension of the first page image (i.e. 1024 pixels×768 pixels) to the receiving-end device 30.

The receiving-end device 30 calculates the ratio (i.e. 2 times) according to the image dimension of the second page image (i.e. 2048 pixels×1536 pixels) and the received image dimension of the first page image. Next, the ratio is respectively multiplied by the first reference point location and the first visual range dimension based on the first page image in order to obtain the second reference point location based on the second page image (i.e. the coordinate values (768,576) of the second coordinate system) and the second visual range dimension (i.e. 1280 pixels×960 pixels).

Lastly, the receiving-end device 30 adjusts the visual range of the second page image (refer to FIG. 4D, the area surrounded by the solid line) according to the second reference point location and the second visual range dimension, and performs processing on the visual range of the second page images (for example, the zooming the visual range of the second page images to the display resolution of the display module 42 to display in full screen), and transmits the processed visual range of the second page images to the display module 42 to display.

Compare to using the coordinate values based on display screen, in the embodiment of the present invention, the visual range is calculated according to the coordinate values based on the first page image and the second page image, which effectively eliminates the calculating error (such as different widths of undisplayable black edges) that can results in the content of the display screen in the human machine interface and the display module do not match each other.

Refer to FIG. 2, a synchronizing note function is further illustrated in another embodiment of the present invention. The detailed steps to implement the synchronizing note function are illustrated in the following.

The first processor 206 further comprises a first note module 2068 connected to the first processing module 2062. When the first note module 2068 receives a note operation (such as drawing pictures or hand writing texts) on the human machine interface 204, generates note data from calculating on the note operation. The first note module 2068 generates a first note picture layer, and draws pictures on the first note picture layer according to the note data. Next, the first note module 2068 performs the combining processing on the first page image and the first note picture layer currently displayed, and transmits the combined first page image to the human machine interface 204 in order to simultaneously display the first page image and the first note picture layer. The first note module 2068 simultaneously transmits the note data to the receiving-end device 30 via the first wireless transceiver 200.

The second processor 304 further comprises a second note module 3048 connected to the second processing module 3042. The second note module 3048 receives the note data via the second wireless transceiver 300, generates a second note picture layer, and draws pictures on the second note picture layer according to the note data. Next, the second note module 3042 performs the combining processing on the second page image and the second note picture layer currently displayed, and transmits the combined the second page image to the display module 42 in order to simultaneously display the second page image and the second note picture layer.

Preferably, the note data comprises a plurality of note coordinates based on the first page image or picture associated information (such as the thickness or colors of the lines). The first note module 2068 transforms the note operation transforming into the plurality of coordinate values of the first coordinate system, and uses the plurality of coordinate values to represent the pictures corresponding to the note data.

Thus, the mirror display system 2 according to the present invention effectively implements the synchronizing note function.

A synchronizing recovery function for the above-mentioned note operation is further illustrated in another embodiment of the present invention. The detailed steps to implement the synchronizing recovery function are illustrated in the following.

The first processor 206 further comprises a first recovering module 2070 connected to the first processing module 2062. When the first recovering module 2070 receives a recovery operation on the human machine interface 204, selects the latest entry of the note data from at least one entry of calculated note data (i.e. the note data generated from calculating on the previously received note operation), and generates an entry of the recovery data according to the latest entry of the note data. Next, the first recovering module 2070 deletes the pictures previously drew on the first note picture layer according to the recovery data, combines and transmits the first note picture layer after deleting the pictures and the first page images to the human machine interface 204 to display. The first recovering module 2070 simultaneously transmits the recovery data to the receiving-end device via the first wireless transceiver 200.

The second processor 304 further comprises a second recovering module 3050 connected to the second processing module 3042. The second recovering module 3050 receives the recovery data via the second wireless transceiver 300, and deletes the pictures drew previously on the second note picture layer according to the recovery data, and combines and transmits the second note picture layer after deleting the pictures and the second page images to the display module 42 to display.

Thus, the mirror display system 2 according to the present invention effectively implements the note operation—the synchronizing recovery function, and provides better user experiences.

Refer to FIG. 5A-5D, FIG. 5A is the schematic diagram of the first page image according to the third embodiment of the present invention, FIG. 5B is a schematic diagram of the first note picture layer according to the third embodiment of the present invention, FIG. 5C is the first schematic diagram of the display screen according to the third embodiment of the present invention, and FIG. 5D is the second schematic diagram of the display screen according to the third embodiment of the present invention. The diagrams are used for illustrating the mentioned synchronizing recovery function with examples.

The transmitting-end device 20 receives the note operation when the first page image as shown in FIG. 5A is displayed, and generates the first note picture layer as shown in FIG. 5B according to the note operation.

In the present example, when the transmitting-end device 20 receives the note operation for the first time, the transmitting-end device 20 draws the pictures N1 (for example, the straight line between the coordinate values (20,200) and the coordinate values (500,200)) corresponding to the first note operation on the first note picture layer. When the transmitting-end device 20 receives the note operation for the second time, the transmitting-end device 20 draws pictures N2 (for example the square formed by the coordinate values (20,500), the coordinate values (500,500), the coordinate values (20,700) and the coordinate values (500, 700)) corresponding to the second note operation on the first note picture layer.

Next, the transmitting-end device 20 combines the first page image shown in FIG. 5A and the first note picture layer shown in FIG. 5B as the image shown in FIG. 5C, and displays the combined image on the human machine interface 204.

When the transmitting-end device 20 receives the recovery operation, the transmitting-end device 20 selects the latest the note data from the plurality of the note data generated previously (i.e. the note data corresponding to the pictures N2), and deletes the pictures N2 from the first note picture layer. Next, the transmitting-end device 20 combines the first page images shown in FIG. 5A and the first note picture layer after deleting the pictures N2 as the image shown in FIG. 5D, and displays the combined image on the human machine interface 204.

It should be noted that, though the transmitting-end device 20 is used as an example to illustrate how to add or delete a note in the present example. The receiving-end device 30 can also use the same method to add or recover pictures (the only difference is that the receiving-end device 30 adds or deletes the pictures N1 or N2 according to the received note data or the recovery data instead of the note operation), the steps are omitted here.

Refer to FIG. 2, a special effect synchronizing playing function is further illustrated in another embodiment of the present invention. The detailed steps to implement the special effect synchronizing playing are illustrated in the following.

The first processor 206 further comprises a first special effect module 2072 connected to the first processing module 2062. The first memory 202 stores a plurality of special effect (Not shown in the diagrams), wherein the plurality of special effect respectively corresponds to a plurality of special effect data. Preferably, the plurality of special effect data is respectively a special effect identifying code or a playing parameter of the plurality of special effect.

When the first special effect module 2072 receives a special effect playing operation on via the human machine interface 204, the first special effect module 2072 obtains an entry of the special effect corresponding the special effect playing operation from the first memory 202 according to the special effect playing operation, and retrieves the special effect data corresponding to the special effect, and playing the special effect for dynamically displaying the first page images on the human machine interface 206. The first special effect module 2072 simultaneously transmits the special effect data corresponding to the obtained special effect to the receiving-end device 30 via the first wireless transceiver 200.

The second processor 304 further comprises a second special effect module 3052 connected to the second processing module 3042. The second memory 302 stores a plurality of special effects (not shown in the diagrams), wherein the plurality of special effects respectively correspond to the mentioned plurality of special effect data. Preferably, the plurality of special effects stored in the second memory 302 and the plurality of special effects stored in the first memory 202 are the same.

The second special effect module 3052 receives the special effect data via the second wireless transceiver 300, and dynamically displays the second page image via the display module 42 according to the special effect data. Substantially, the second special effect module 3052 inquires the special effect corresponding to the received special effect data in the second memory 302, and dynamically displays the second page image via playing the special effect. Preferably, the second page image corresponds to the first page image.

Thus, the mirror display system 2 according to the present invention effectively implements the special effect synchronizing playing function, and provides better user experiences. In the embodiment, the transmitting-end device 20 only needs to transmit the special effect data with less data to enable the synchronizing playing special effect at the receiving-end device.

It should be noted that, the first transforming module 2060, the first processing module 2062, the first synchronizing module 2064, the first zooming module 2066, the first note module 2068, the first recovering module 2070, the first special effect module 2072, the second transforming module 3040, the second processing module 3042, the second synchronizing module 3044, the second zooming module 3046, the second note module 3048, the second recovering module 3050 and the second special effect module 3052 are implemented either via hardware modules (such as electronic circuits or integrated circuits with digital circuits burnt-in), or software modules (such as programs, Application Programming Interface (API) or firmware), but is not limited thereto. When the mentioned modules are implemented via software modules, the connections among the modules refer to the link among programs.

Substantially, the first memory 202 further stores a first computer program 2022, and the second memory 302 further stores a second computer program 3022. The first computer program 2022 records the program codes or the machine codes for implementing the modules included in the first processor 206. The first processor 206 executes the program codes or the machine codes of the first computer program 2020 in order to implement the mentioned functions of modules included in the first processor 206. The second computer program 3022 records the program codes or the machine codes for implementing the modules included in the second processor 304. The second processor 304 executes the program codes or the machine codes of the second computer program 3022 in order to implement the mentioned functions of modules included in the second processor 304.

Figure 6:
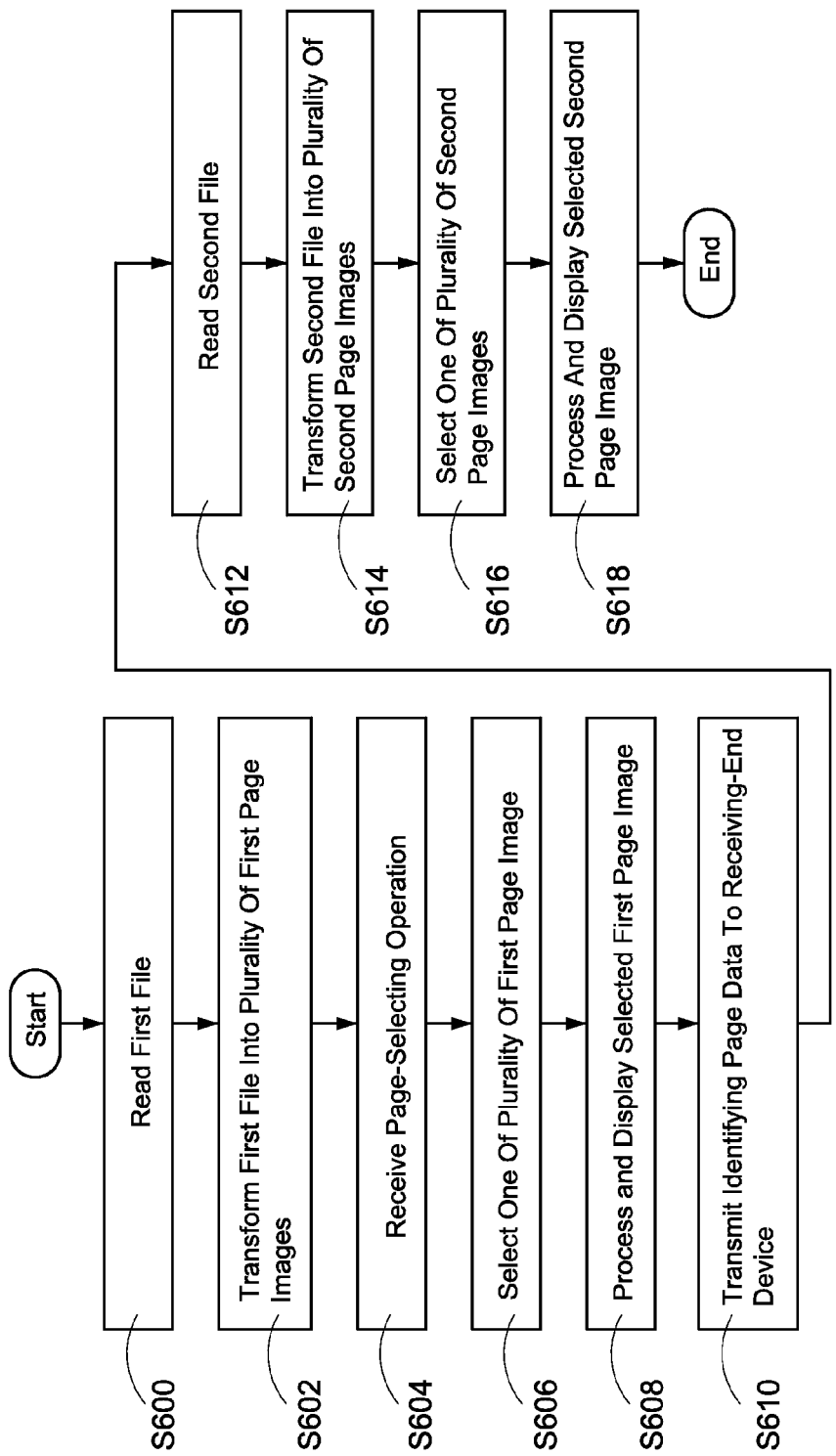
FIG. 6 is a mirror display flowchart according to the first embodiment of the present invention.

FIG. 6 is a mirror display flowchart according to the first embodiment of the present invention. The mirror display method having low data traffic shown in FIG. 6 is used in the mirror display system 2 shown in FIG. 2.

Step S600: read the first file 2020.

Step S602: the transmitting-end device 20 transforms the first file 2020 into the plurality of the first page images.

Step S604: receive the page-selecting operation.

Step S606: select one of the plurality of the first page images. Substantially, the transmitting-end device 20 selects one of the plurality of the first page images according to the page-selecting operation.

Step S608: process and display the selected first page image. Substantially, the transmitting-end device 20 performs processing on the selected first page image, and displays the selected first page image on the human machine interface 206.

Step S610: transmits the identifying page data to the receiving-end device 30. Substantially, the transmitting-end device 20 transmits the identifying page data of the selected first page image to the receiving-end device 30 via the network 40.

Step S612: read the second file 3020. Substantially, the receiving-end device 30 reads the second file 3020 having the same content as the first file 2020 from the second memory 302.

Step S614: transforms the second file 3020 into the plurality of the second page images. Preferably, the plurality of the second page images respectively correspond the plurality of the first page images.

Step S616: select one of the plurality of the second page images. Substantially, the receiving-end device 30 selects the second page image corresponding to the received identifying page data.

Step S618: process and display the selected second page image. Substantially, the receiving-end device 30 performs processing on the selected second page image, and transmits the selected second page image to the display module 42 to display. Preferably, the selected second page image and the selected first page image have the same content.

Figure 7:
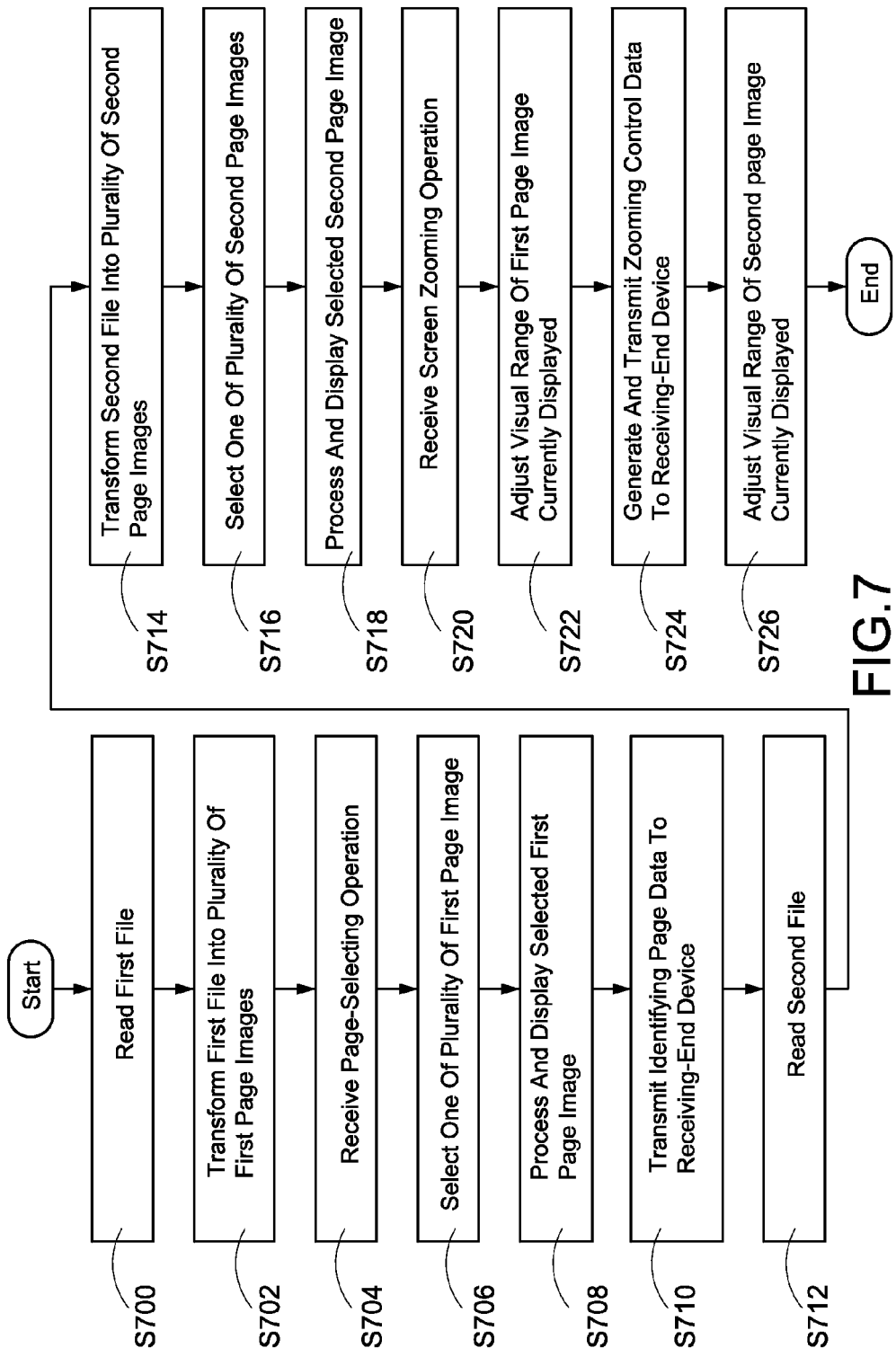
FIG. 7 is a mirror display flowchart according to the second embodiment of the present invention.

FIG. 7 is a mirror display flowchart according to the second embodiment of the present invention. The mirror display method having low data traffic shown in FIG. 7 is used in the mirror display system 2 shown in FIG. 2.

The steps from Step S700 to Step S718 are identical to the abovementioned steps from Step S600 to Step S618, the steps are omitted here.

Step S720: receive the screen zooming operation.

Step S722: adjust the visual range of the first page image displayed currently. Substantially, the transmitting-end device 20 adjusts the visual range of the first page image displayed currently according to the screen zooming operation in order to enable the human machine interface 204 to display the first page image with zooming effect.

Step S724: generate and transmit the zooming control data to the receiving-end device 30. Substantially, the transmitting-end device 20 generates the zooming control data according to the adjusted visual range of the first page image, and transmits the zooming control data to the receiving-end device 30 via the network 42. Preferably, the zooming control data comprises the first reference point location and the first visual range dimension based on the first page image, but is not limited thereto.

In another embodiment of the present invention, the zooming control data comprises the second reference point location and the second visual range dimension based on the second page image. The transmitting-end device 20 generates the zooming control data according to the first reference point location, the first visual range dimension based on the first page image and the ratio between the first page image and the second page image.

Step S726: adjust the visual range of the second page image currently displayed. The receiving-end device 30 adjusts the visual range of the second page image currently displayed according to the zooming control data to enable the display module 42 to display the second page image with image zooming effect.

Figure 8:
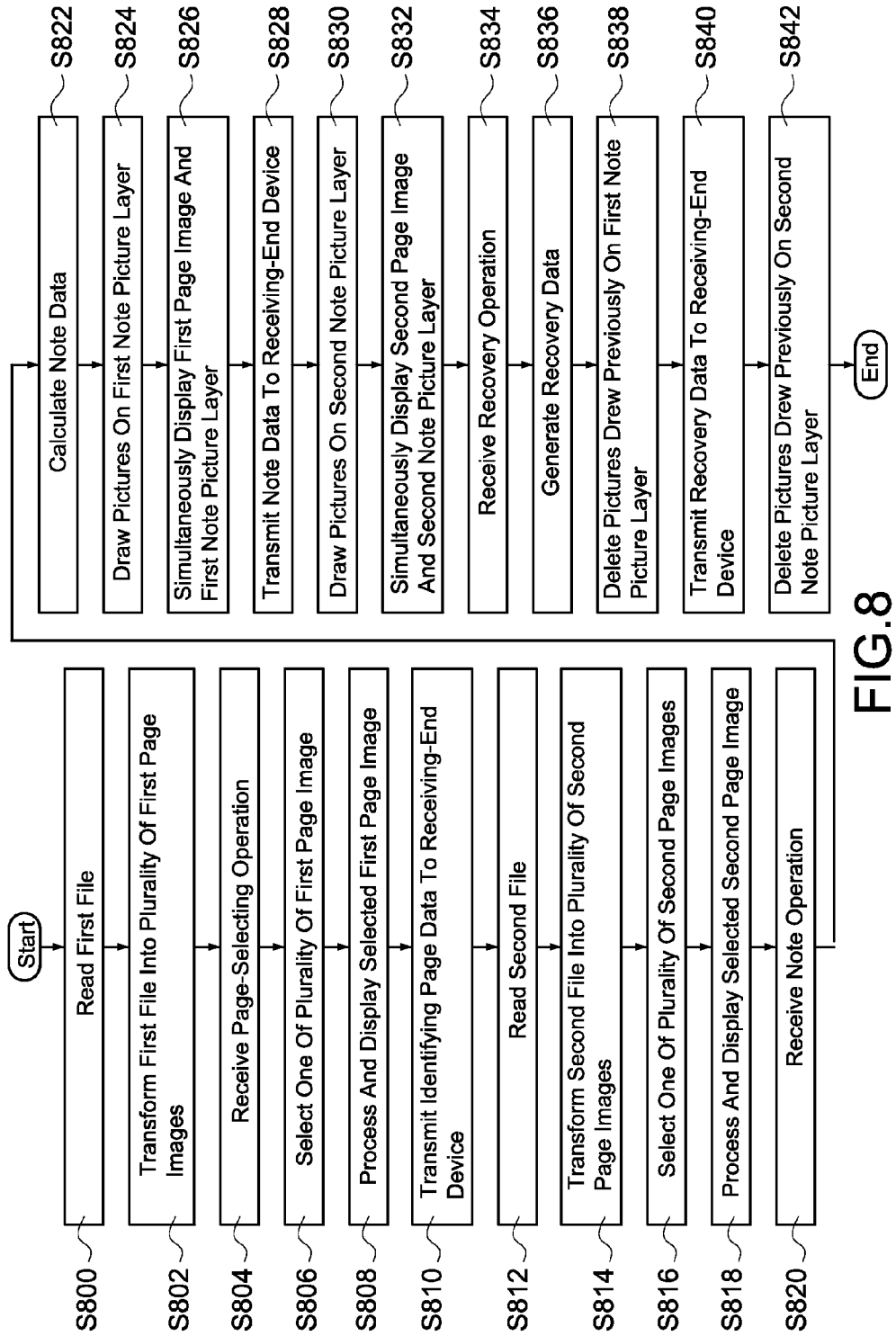
FIG. 8 is a mirror display flowchart according to the third embodiment of the present invention.

FIG. 8 is a mirror display flowchart according to the third embodiment of the present invention. The mirror display method having low data traffic shown in FIG. 8 is used in the mirror display system 2 shown in FIG. 2.

The steps from Step S800 to Step S818 are identical to the abovementioned steps from Step S600 to Step S618, the steps are omitted here.

Step S820: receive the note operation.

Step S822: calculate the note data. Substantially, the transmitting-end device 20 calculates the note data according to the note operation. Preferably, the note data comprises the plurality of note coordinates based on the first page image. The plurality of note coordinates are used for representing at least one picture.

Step S824: draw pictures on the first note picture layer. Substantially, the transmitting-end device 20 draws pictures on the first note picture layer according to the note data.

Step S826: simultaneously displays the first page image and the first note picture layer. Substantially, the transmitting-end device 20 combines the first page image and the first note picture layer, and transmits the combined first page image to the human machine interface 204 to display.

Step S828: transmits the note data to the receiving-end device 30.

Step S830: draws pictures on the second note picture layer. Substantially, the receiving-end device 30 draws pictures on the second note picture layer according to the plurality of note coordinates of the note data after receiving the note data.

Step S832: simultaneously displays the second page image and the second note picture layer. Substantially, the receiving-end device 30 combines the second page image and the second note picture layer, and transmits the combined second page image to the display module 42 to display.

Thus, the mirror display method having low data traffic according to the embodiment implements synchronizing note function.

Step S834: receive the recovery operation. Substantially, the transmitting-end device 20 receives the recovery operation via the human machine interface 204.

Step S836: generate the recovery data. Substantially, the transmitting-end device 20 generates the recovery data according to latest note data (i.e. the note data generated from last calculating operation). Preferably, the recovery data comprises the plurality of coordinate values corresponding to the partial picture on the first note picture layer.

Step S838: delete the pictures drew previously on the first note picture layer. Substantially, the transmitting-end device 20 deletes the pictures drew previously on the first note picture layer according to the plurality of coordinate values of the recovery data.

Also, the transmitting-end device 20 combines the first page image and the first note picture layer with the pictures deleted, and transmits the combined first page image to the human machine interface 204 to display.

Step S840: transmits the recovery data to the receiving-end device 30.

Step S842: delete the pictures drew previously on the second note picture layer. Substantially, the transmitting-end device 20 deletes the pictures drew previously on the second note picture layer according to the plurality of coordinate values of the recovery data.

Also, the transmitting-end device 20 combines the second page image and the second note picture layer with the pictures deleted, and transmits the combined second page image to the display module 42 to display.

Thus, the mirror display method having low data traffic according to the embodiment implements the synchronizing recovery function.

Figure 9:
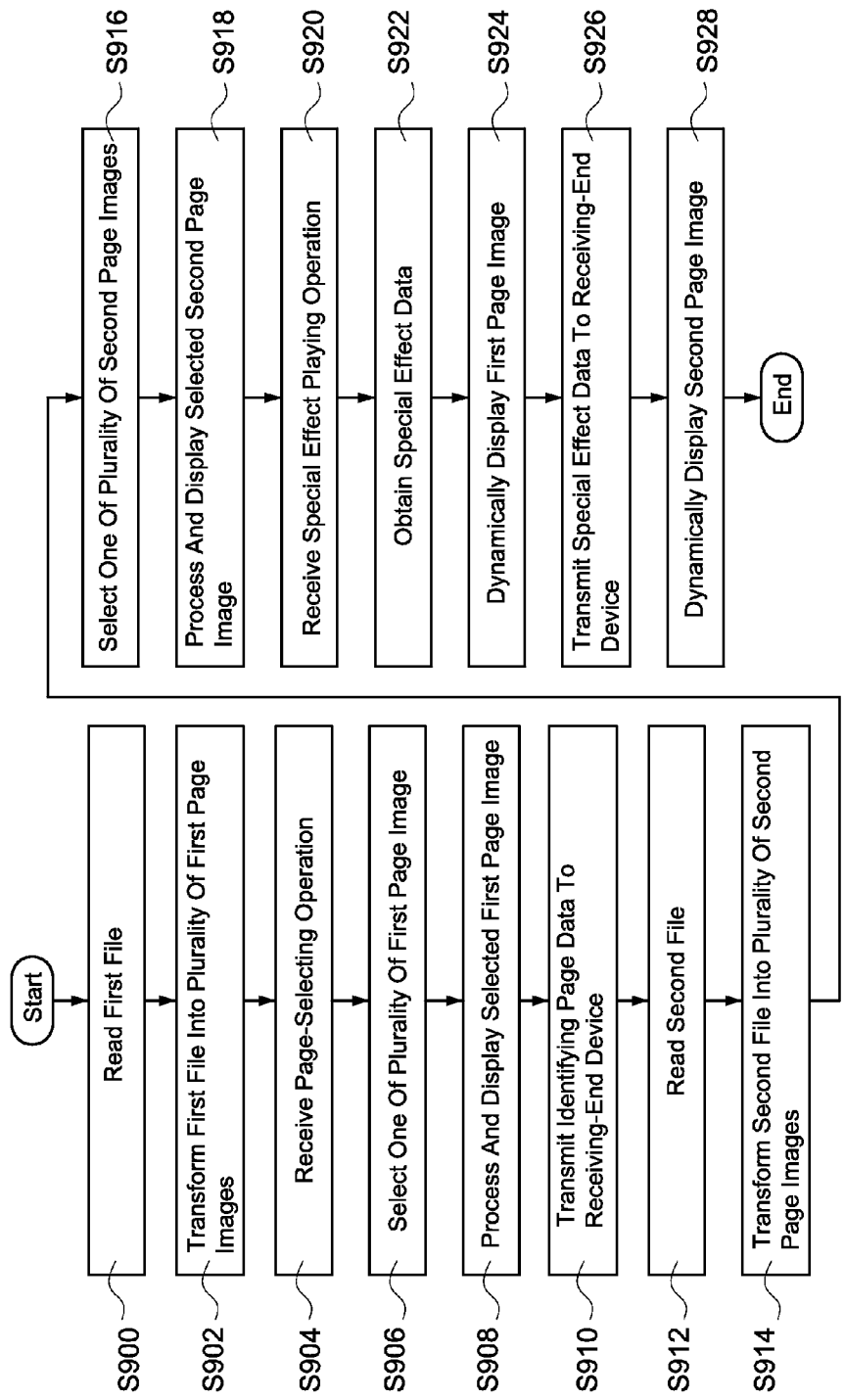
FIG. 9 is a mirror display flowchart according to the fourth embodiment of the present invention.

FIG. 9 is a mirror display flowchart according to the fourth embodiment of the present invention. The mirror display method having low data traffic shown in FIG. 9 is used in the mirror display system 2 shown in FIG. 2.

The steps from Step S900 to Step S918 are identical to the abovementioned steps from Step S600 to Step S618, the steps are omitted here.

Step S920: receive the special effect playing operation. Substantially, the transmitting-end device 20 receives the special effect playing operation via the human machine interface 204.

Step S922: obtain the special effect data. Substantially, the transmitting-end device 20 obtains an entry of the special effect in the first memory 202 corresponding to the special effect playing operation, and retrieves the special effect data corresponding to the special effect.

Step S924: dynamically display the first page images. Substantially, the transmitting-end device 20 dynamically displays the first page images via playing the special effect.

Step S926: transmits the special effect data to the receiving-end device 30.

Step S928: dynamically display the second page images. Substantially, the receiving-end device inquires the special effect corresponding to the received special effect data in the second memory 302, and dynamically displays the second page image via playing the special effect. Preferably, the second page image corresponds to the first page image.

Thus, the mirror display method having low data traffic according to the embodiment implements the special effect synchronizing playing function.

Figure 10:
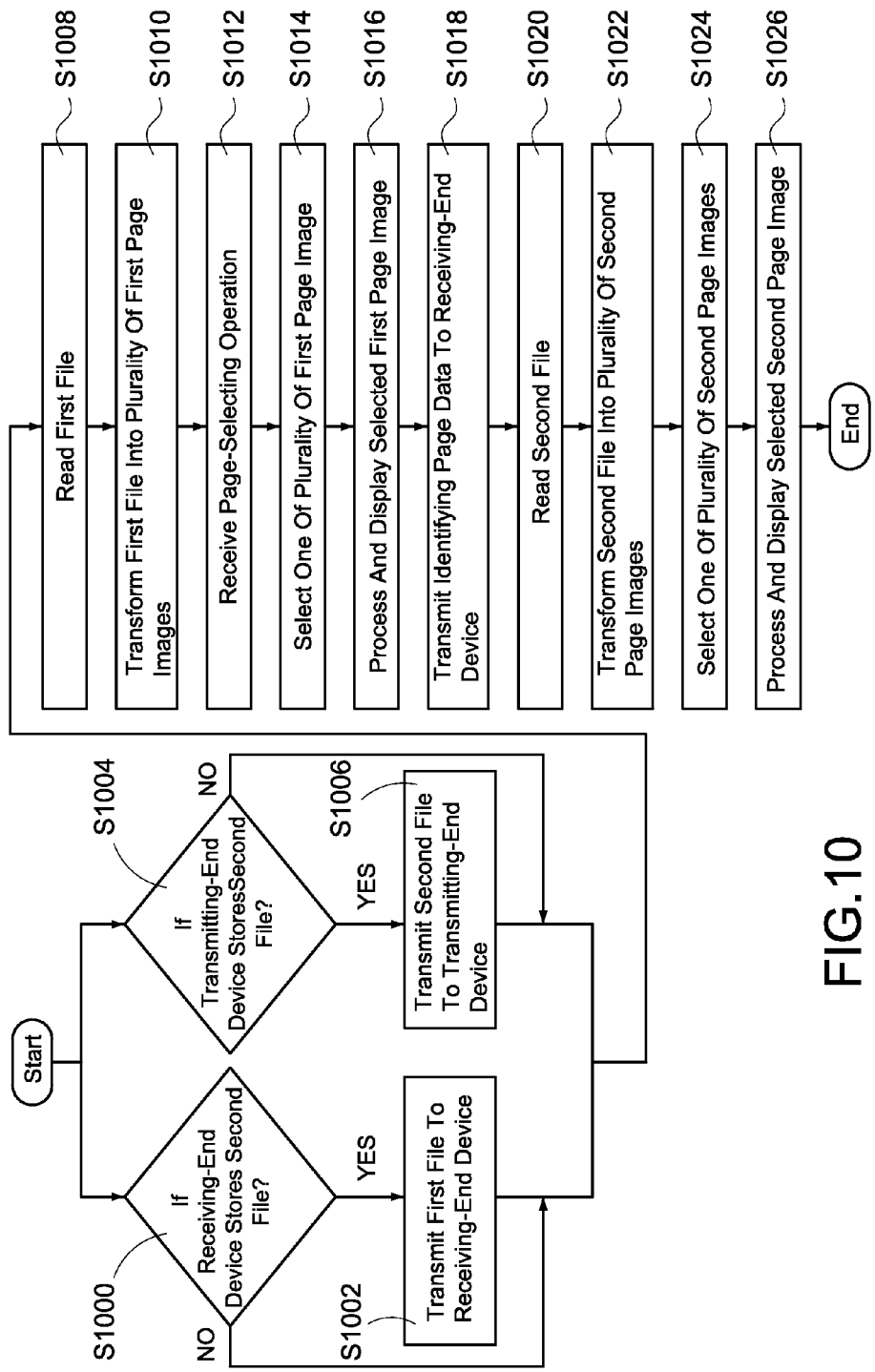
FIG. 10 is a mirror display flowchart according to the fifth embodiment of the present invention

FIG. 10 is a mirror display flowchart according to the fifth embodiment of the present invention. The mirror display method having low data traffic shown in FIG. 10 is used in the mirror display system 2 shown in FIG. 2.

Step S1000: determine if the receiving-end device 30 does not store the second file 3020. Substantially, the transmitting-end device 20 and the receiving-end device 30 establish the network connection, proactively determine if the receiving-end device 30 does not store the second file 3020 which has the same content of the first file 2020. If the receiving-end device 30 does not store the second file 3020, then the method continue to execute Step S1002 to proactively perform file synchronization; or the method move to execute Step S1008.

In another embodiment of the present invention, when the transmitting-end device 20 determines that the receiving-end device 30 does not store the second file 3020, the transmitting-end device 20 sends warning message via the first warning unit 208 or the human machine interface 204 and terminates the mirror display without executing Step S1002.

Step S1002: transmit the first file 2020 to the receiving-end device 30. Substantially, the transmitting-end device 20 transmits the duplicate of the first file 2020 to the receiving-end device to be the second file 3020 via the network 40 and completes the file synchronization of the first file 2020 and the second file 3020.

Step S1004: determines if the transmitting-end device 20 does not store the first file 2020. Substantially, the receiving-end device 30 proactively determines if the transmitting-end device 20 does not store and the first file 2020 which has the same content of the second file 3020 after establishing the network connection with the transmitting-end device 20. If the transmitting-end device 20 does not store the first file 2020, then the method moves to execute Step S1006 to proactively perform the file synchronization; or the method moves to execute Step S1008.

In another embodiment of the present invention, when the receiving-end device 30 determines that the transmitting-end device 20 does not store the first file 2020, the receiving-end device 30 sends warning messages via the second warning unit 306 or the display module 42, and terminates the mirror display without executing Step S1006.

Step S1006: transmits the second file 3020 to the transmitting-end device 20. Substantially, the receiving-end device 30 transmits the duplicate of the second file 3020 to the transmitting-end device 20 to be the first file 2020 via the network 40 and completes the file synchronization of the first file 2020 and the second file 3020.

It should be noted that, the Step S1000-S1002 and the Step S1004-S1006 are not dependent steps. In other words, the alternative flows of the mirror display method include only executing the Step S1000-S1002, only executing the Step S1004-S1006 or executing both the Step S1000-S1002 and the Step S1004-S1006.

The steps from Step S1008 to Step S1026 are identical to the above-mentioned steps from Step S600 to Step S618, the steps are omitted here.

The system and method according to the present invention effectively reduce the data traffic required by the mirror display, and provide a smoother mirror display.

As the skilled person will appreciate, various changes and modifications can be made to the described embodiment. It is intended to include all such variations, modifications and equivalents which fall within the scope of the present invention, as defined in the accompanying claims.

What is claimed is:

1. A mirror display system having low data traffic, comprising:
   a transmitting-end device, comprising:
   a first wireless transceiver;
   a human machine interface displaying images and receiving a page-selecting operation;
   a first memory storing the first file; and
   a first processor electrically connected to the first wireless transceiver, the human machine interface and the first memory, comprising:
   a first transforming module reading and transforming the first file into a plurality of the first page images; and
   a first processing module connected to the first transforming module, selecting one of the plurality of first page images according to the page-selecting operation, transmitting the selected first page image to the human machine interface for displaying and externally transmitting an identifying page data of the selected first page image via the first wireless transceiver; and
   a receiving-end device connected to a display module, and comprising:
   a second wireless transceiver receiving the identifying page data from the transmitting-end device;
   a second memory storing a second file, wherein the second file and the first file having the same content; and
   a second processor electrically connected to the first wireless transceiver and the second memory, comprising:
   a second transforming module reading and transforming the second file into a plurality of the second page images, wherein the plurality of the second page images respectively corresponding the plurality of the first page images; and
   a second processing module connected to the second transforming module, selecting one of the plurality of second page images according to a page-selecting operation, and transmitting the selected first page image to the display module for displaying, wherein the selected second file image and the selected first file image having the same content;
   wherein the first processor further comprises a first zooming module connected to the first processing module, adjusting the visual range of the first page image currently displayed on the human machine interface according to a screen zooming operation received by the human machine interface, and calculating zooming control data according to the adjusted visual range of the first page image; the second processor further comprises a second zooming module connected to the second processing module, adjusting the visual range of the second page image currently displayed on the display module according to the zooming control data.

2. The mirror display system having low data traffic of claim 1, wherein the first processor further comprises a first synchronizing module connected to the first processing module, sending a waning via a first warning unit or transmitting the first file to the receiving-end device to be the second file via the first wireless transceiver upon detecting the second file not stored in the receiving-end device.

3. The mirror display system having low data traffic of claim 1, wherein the second processor further comprises a second synchronizing module connected to the second processing module, sending a waning via a second warning unit or transmitting the second file to the receiving-end device to be the first file via the first wireless transceiver upon detecting the first file not stored in the receiving-end device.

4. The mirror display system having low data traffic of claim 1, wherein the zooming control data comprises a first reference point location and a first visual range dimension based on the first page image.

5. The mirror display system having low data traffic of claim 1, wherein the first zooming module calculates the zooming control data according to a first reference point location based on the first page images, a first visual range dimension and a ratio between the first page image and the second page image, and the zooming control data comprises a second reference point location and a second visual range dimension based on the second page image.

6. The mirror display system having low data traffic of claim 1, wherein the first processor further comprises a first note module connected to the first processing module, calculating note data according to a note operation received by the human machine interface, and drawing pictures on a first note picture layer according to the note data, the first note module simultaneously displays the first page image and the first note picture layer via the human machine interface; the second processor further comprises a second note module connected to the second processing module, receiving the note data via the second wireless transceiver, and drawing pictures on a second note picture layer according to the note data, the second note module simultaneously displays the second page image and the second note picture layer via the display module.

7. The mirror display system having low data traffic of claim 6, wherein the note data comprises a plurality of note coordinates based on the first page image.

8. The mirror display system having low data traffic of claim 6, wherein the first processor further comprises a first recovering module connected to the first processing module, calculating recovery data according to a recovery operation received by the human machine interface, and deleting the pictures drew previously on the first note picture layer according to the recovery data; the second processor further comprises a second recovering module connected to the second processing module, receiving the recovery data via the second wireless transceiver, and deleting the pictures drew previously on the second note picture layer according to the recovery data.

9. The mirror display system having low data traffic of claim 1, wherein the first processor further comprises a first special effect module connected to the first processing module, generating a special effect corresponding to the special effect playing operation, and generating a special effect data corresponding the special effect upon the human machine interface receives a special effect playing operation, and playing the special effect for dynamically displaying the first page image in the human machine interface, the first special effect module transmits the special effect data to the receiving-end device via the first wireless transceiver; the second processor further comprises a second special effect module connected to the second processing module, receiving the special effect data, inquiring the special effect corresponding to the special effect data via the second wireless transceiver, and playing the special effect for dynamically displaying the second page images in the display module, wherein the second page image corresponds to the first page images.

10. A mirror displaying method having low data traffic used in a mirror display system, the mirror display system comprising a transmitting-end device and a receiving-end device, the mirror display method comprise following steps:
   a) the transmitting-end device reading a first file;
   b) transforming the first file into a plurality of the first page images;
   c) receiving a page-selecting operation;
   d) selecting one of the plurality of the first page images according to the page-selecting operation;
   e) displaying the selected first page image;
   f) transmitting the identifying page data of the selected first page image to the receiving-end device;
   g) the receiving-end device reading a second file, wherein the second file and the first file have the same content;
   h) transforming the second file into a plurality of the second page images, wherein the plurality of the second page images respectively corresponding the plurality of the first page images;
   i) selecting the second page images corresponding to the identifying page data;
   j) displaying the selected second page images, wherein the selected second page images and the selected first page images have the same content;
   k1) the transmitting-end device receiving a screen zooming operation;
   k2) adjusting the visual range of the first page image currently displayed according to a screen zooming operation;
   k3) calculating zooming control data according to the adjusted visual range of the first page image and transmitting the zooming control data to the receiving-end device; and
   k4) the receiving-end device adjusting the visual range of the second page image currently displayed according to the zooming control data.

11. The mirror displaying method having low data traffic of claim 10, wherein the method further comprises a step a1 before the step a: sending a waning or transmitting the first file to the receiving-end device to be the second file upon detecting the second file not stored in the receiving-end device.

12. The mirror displaying method having low data traffic of claim 10, wherein the method further comprises a step a2 before the step a: sending a waning or transmitting the second file to the receiving-end device to be the first file upon detecting the first file not stored in the receiving-end device.

13. The mirror displaying method having low data traffic of claim 10, wherein the zooming control data comprises a first reference point location and a first visual range dimension based on the first page image.

14. The mirror displaying method having low data traffic of claim 10, wherein, in the step k3, the zooming control data is calculated according to a first reference point location, a first visual range dimension and a ratio between the first page image based on the first page images and the second page image, and the zooming control data comprises a second reference point location and a second visual range dimension based on the second page image.

15. The mirror displaying method having low data traffic of claim 10, wherein the method further comprises following steps:
   l1) the transmitting-end device receiving a note operation;
   l2) calculating note data according to the note operation;
   l3) drawing pictures on a first note picture layer according to the note data;
   l4) simultaneously displaying the first page image and the first note picture layer;
   l5) transmitting the note data to the receiving-end device;
   l6) the receiving-end device drawing pictures on a second note picture layer according to the note data; and
   l7) simultaneously displaying the second page images and the second note picture layer.

16. The mirror displaying method having low data traffic of claim 15, wherein the note data comprises a plurality of note coordinates based on the first page image.

17. The mirror displaying method having low data traffic of claim 15, wherein the method further comprises following steps:
   m1) the transmitting-end device receiving a recovery operation;
   m2) calculating the recovery data according to the latest note data;
   m3) deleting the pictures drew preciously on the first note picture layer according to the recovery data;
   m4) transmitting the recovery data to the receiving-end device; and m5) the receiving-end device deleting the pictures drew preciously on the second note picture layer according to the recovery data.

18. The mirror displaying method having low data traffic of claim 10, wherein the method further comprises following steps:
n1) the transmitting-end device receiving a special effect playing operation;
n2) retrieving a special effect according to the special effect playing operation;
n3) executing the special effect for dynamically displaying the first page image;
n4) transmitting the special effect data corresponding to the special effect to the receiving-end device; and
n5) the receiving-end device retrieving the corresponding special effect according to the special effect data, and executing the special effect for dynamically displaying the second page image.

\* \* \* \* \*